United States Patent
Kirigin et al.

(10) Patent No.: US 10,242,220 B2
(45) Date of Patent: *Mar. 26, 2019

(54) REQUESTING MODIFICATION RIGHTS TO A LINKED FILE SET

(71) Applicant: Dropbox, Inc., San Francisco, CA (US)

(72) Inventors: Ivan Kirigin, San Mateo, CA (US); Olumakinde Adegboyega Adeagbo, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,479

(22) Filed: Dec. 20, 2017

(65) Prior Publication Data

US 2018/0114032 A1   Apr. 26, 2018

Related U.S. Application Data

(63) Continuation of application No. 15/410,150, filed on Jan. 19, 2017, now Pat. No. 9,881,175, which is a
(Continued)

(51) Int. Cl.
*H04L 9/14* (2006.01)
*G06F 21/62* (2013.01)
(Continued)

(52) U.S. Cl.
CPC .... *G06F 21/6218* (2013.01); *G06F 17/30076* (2013.01); *G06F 17/30165* (2013.01);
(Continued)

(58) Field of Classification Search
CPC ...................................................... H04L 9/14
See application file for complete search history.

(56) References Cited

U.S. PATENT DOCUMENTS 6,453,334 B1   9/2002   Vinson et al.
6,684,212 B1   1/2004   Day et al.
(Continued)

OTHER PUBLICATIONS

Houston, Andrew et al., "File Sharing Via Link Generation", PCT International Search Report and Written Opinion, PCT Application No. PCT/US2011/041531, dated Apr. 6, 2012, 8 pages., The attachment includes the full publication. The published date is the mailing date of the ISR which was what originally used by the first citing of this reference., Apr. 6, 2012.
(Continued)

*Primary Examiner* — William S Powers
(74) *Attorney, Agent, or Firm* — Polsinelli PC

(57) ABSTRACT

A computer implemented system and method of sharing files between a link sharer and a link recipient over a network. The method comprises generating, in response to a request by a link sharer, a file sharing link to a file set, where the link does not provide a link recipient the ability to modify the contents of the linked file set. In response to receiving an indication that the generated link has been activated by a link recipient, displaying a representation of the linked file set with a display element configured to send a request for modification rights to the linked file set when activated by the link recipient. In response to receiving the request for modification rights, either automatically granting modification rights to the linked file set or sending notice to the link sharer indicating that the link recipient is requesting modification rights to the linked file set.

20 Claims, 12 Drawing Sheets

Related U.S. Application Data continuation of application No. 14/724,086, filed on May 28, 2015, now Pat. No. 9,569,635, which is a continuation of application No. 13/597,301, filed on Aug. 29, 2012, now Pat. No. 9,075,954.

(51) Int. Cl.

| | | |
|---|---|---|
| *G06F 21/00* | (2013.01) | |
| *G06F 21/64* | (2013.01) | |
| *H04L 29/06* | (2006.01) | |
| *G06F 17/30* | (2006.01) | |
| *H04L 29/08* | (2006.01) | |

(52) U.S. Cl.
CPC .. *G06F 17/30174* (2013.01); *G06F 17/30179* (2013.01); *G06F 21/00* (2013.01); *G06F 21/645* (2013.01); *H04L 63/06* (2013.01); *H04L 63/10* (2013.01); *H04L 67/06* (2013.01); *G06F 2221/2119* (2013.01); *G06F 2221/2141* (2013.01); *H04L 2463/101* (2013.01)

(56) References Cited

U.S. PATENT DOCUMENTS

| | | | |
|---|---|---|---|
| 6,687,741 | B1 | 2/2004 | Ramaley et al. |
| 6,988,138 | B1* | 1/2006 | Alcorn .................. G09B 5/02 |
| | | | 434/350 |
| 7,177,426 | B1* | 2/2007 | Dube .................. G06F 21/6209 |
| | | | 380/262 |
| 7,206,806 | B2 | 4/2007 | Pineau |
| 7,260,646 | B1 | 8/2007 | Stefanik et al. |
| 7,401,104 | B2 | 7/2008 | Darshatkumar et al. |
| 7,460,130 | B2 | 12/2008 | Salganicoff |
| 7,676,526 | B1 | 3/2010 | Beloussov et al. |
| 7,730,113 | B1 | 6/2010 | Payette et al. |
| 7,734,690 | B2 | 6/2010 | Moromisato et al. |
| 7,756,892 | B2 | 7/2010 | Levy |
| 7,822,793 | B2* | 10/2010 | Rawat .............. G06F 17/30165 |
| | | | 707/694 |
| 7,970,850 | B1* | 6/2011 | Callanan .............. H04L 51/046 |
| | | | 709/206 |
| 8,065,424 | B2 | 11/2011 | Foresti et al. |
| 8,140,506 | B2 | 3/2012 | Pennington |
| 8,194,940 | B1 | 6/2012 | Kiyohara et al. |
| 8,584,259 | B2 | 11/2013 | Le Chevalier et al. |
| 8,756,656 | B1 | 6/2014 | Hartmann |
| 8,984,031 | B1 | 3/2015 | Todd |
| 9,049,176 | B2 | 6/2015 | Ferdowsi |
| 2001/0056463 | A1 | 12/2001 | Grady et al. |
| 2002/0073443 | A1 | 6/2002 | Heifetz et al. |
| 2002/0133515 | A1 | 9/2002 | Kagle et al. |
| 2003/0014477 | A1 | 1/2003 | Oppenheimer et al. |
| 2003/0097410 | A1 | 5/2003 | Atkins et al. |
| 2003/0120729 | A1 | 6/2003 | Kim et al. |
| 2003/0152904 | A1 | 8/2003 | Doty |
| 2003/0227487 | A1 | 12/2003 | Hugh |
| 2004/0025025 | A1 | 2/2004 | Venkatesan et al. |
| 2004/0044746 | A1 | 3/2004 | Matsusaka |
| 2005/0076030 | A1 | 4/2005 | Hada et al. |
| 2005/0086296 | A1* | 4/2005 | Chi .................. G06Q 10/10 |
| | | | 709/203 |
| 2005/0091289 | A1 | 4/2005 | Shappell et al. |
| 2005/0192052 | A1* | 9/2005 | Tenhunen ......... H04L 29/06027 |
| | | | 455/557 |
| 2005/0226166 | A1 | 10/2005 | Agrawal et al. |
| 2005/0240428 | A1 | 10/2005 | Gabrick et al. |
| 2006/0031489 | A1 | 2/2006 | Marcjan |
| 2006/0061599 | A1 | 3/2006 | Yu et al. |
| 2006/0095514 | A1 | 5/2006 | Wang |
| 2006/0133407 | A1 | 6/2006 | Kuisma |
| 2006/0168233 | A1* | 7/2006 | Alcorn .................. G09B 5/02 |
| | | | 709/226 |
| 2006/0212481 | A1 | 9/2006 | Stacey et al. |
| 2006/0230030 | A1 | 10/2006 | Volpa et al. |
| 2007/0016613 | A1 | 1/2007 | Foresti et al. |
| 2007/0118514 | A1 | 5/2007 | Mariappan |
| 2007/0156434 | A1 | 7/2007 | Martin et al. |
| 2007/0174341 | A1 | 7/2007 | Konda et al. |
| 2007/0203917 | A1 | 8/2007 | Du et al. |
| 2007/0208751 | A1* | 9/2007 | Cowan .................. G06Q 10/10 |
| 2007/0214169 | A1 | 9/2007 | Audet et al. |
| 2007/0233647 | A1 | 10/2007 | Rawat et al. |
| 2007/0239760 | A1 | 10/2007 | Simon |
| 2007/0260747 | A1 | 11/2007 | Samzelius et al. |
| 2007/0279379 | A1 | 12/2007 | Stefanik et al. |
| 2007/0289022 | A1 | 12/2007 | Wittkotter |
| 2008/0091725 | A1 | 4/2008 | Hwang et al. |
| 2008/0109910 | A1 | 5/2008 | Day et al. |
| 2008/0177994 | A1 | 7/2008 | Mayer |
| 2008/0216139 | A1 | 9/2008 | Liwerant et al. |
| 2008/0244721 | A1 | 10/2008 | Barrus et al. |
| 2009/0216569 | A1 | 8/2009 | Bonev et al. |
| 2009/0287715 | A1 | 11/2009 | Chi et al. |
| 2009/0300723 | A1 | 12/2009 | Nemoy et al. |
| 2010/0011431 | A1 | 1/2010 | Cynkin et al. |
| 2010/0063961 | A1 | 3/2010 | Guiheneuf et al. |
| 2010/0185698 | A1 | 7/2010 | Lee et al. |
| 2010/0211998 | A1 | 8/2010 | Soelberg et al. |
| 2010/0274864 | A1 | 10/2010 | Jalili |
| 2011/0035503 | A1 | 2/2011 | Zaid et al. |
| 2011/0137986 | A1 | 6/2011 | Wolf |
| 2011/0154456 | A1 | 6/2011 | Machani |
| 2011/0161430 | A1* | 6/2011 | Callanan .............. H04L 51/046 |
| | | | 709/206 |
| 2011/0167159 | A1 | 7/2011 | Bethlehem et al. |
| 2011/0264532 | A1 | 10/2011 | Chan et al. |
| 2011/0264768 | A1 | 10/2011 | Walker et al. |
| 2011/0276638 | A1 | 11/2011 | Errico et al. |
| 2011/0287748 | A1 | 11/2011 | Angel et al. |
| 2012/0127328 | A1 | 5/2012 | Winbush, III |
| 2012/0131005 | A1 | 5/2012 | Shen et al. |
| 2012/0151002 | A1 | 6/2012 | Lin |
| 2012/0197980 | A1 | 8/2012 | Terleski et al. |
| 2012/0209892 | A1 | 8/2012 | MacAskill et al. |
| 2012/0278404 | A1 | 11/2012 | Meisels et al. |
| 2012/0290686 | A1 | 11/2012 | Anchan |
| 2012/0324121 | A1 | 12/2012 | Carr |
| 2013/0013560 | A1 | 1/2013 | Goldberg et al. |
| 2013/0013561 | A1 | 1/2013 | Chan et al. |
| 2013/0018960 | A1 | 1/2013 | Knysz et al. |
| 2013/0091026 | A1 | 4/2013 | Deng et al. |
| 2013/0174272 | A1 | 7/2013 | Chevalier et al. |
| 2013/0332854 | A1 | 12/2013 | Roman |
| 2013/0332856 | A1 | 12/2013 | Sanders et al. |

OTHER PUBLICATIONS

Gimp Quickies, http://www.gimp.org/about/ (Retrieved on Apr. 14, 2016 from http://www.gimp.org/tutorials/GIMP_Quickies/).

\* cited by examiner

Dropbox

Patent Notes

| Name | Size | Modified |
|---|---|---|
| Bilski and the Ambiguity of 'An Unpatentable Abstract Idea'.pdf | 188.63 KB | 45 mins ago |
| burt-magen_computer-advanced-claim-drafting.pdf | 162.48 KB | 45 mins ago |
| Claim Drafting Strategies.pdf | 55.77 KB | 44 mins ago |
| Claiming software.pdf | 272.18 KB | 45 mins ago |
| Computer Program Patent Infringement.pdf | 350.74 KB | 45 mins ago |
| Direct Infringement of Method claims.pdf | 81.93 KB | 45 mins ago |
| Fed cir En Bac decisions article.pdf | 298.53 KB | 45 mins ago |
| Landis on Mechanics of Patent Claim Drafting.pdf | 140.78 KB | 45 mins ago |
| Life after Bilski.pdf | 388.36 KB | 45 mins ago |
| Patent Eligibility in the Wake of Bilski Business as Usual.pdf | 1.06 MB | 45 mins ago |
| Patent Eligible Inventions after Bilski - History and Theory.pdf | 531.48 KB | 45 mins ago |

REQUESTING MODIFICATION RIGHTS TO A LINKED FILE SET

CROSS REFERENCE TO RELATED APPLICATIONS

This application is a continuation of U.S. patent application Ser. No. 15/410,150, filed Jan. 19, 2017, which is a continuation of U.S. patent application Ser. No. 14/724,086, filed May 28, 2015, now U.S. Pat. No. 9,569,635, which is a continuation of U.S. patent application Ser. No. 13/597,301, filed Aug. 29, 2012, now U.S. Pat. No. 9,075,954; the contents of each of the above patent applications are expressly incorporated herein by reference in its entirety for all purposes herein.

FIELD

Various embodiments described herein relate generally to sharing files over a network. Particular embodiments pertain to systems and methods for allowing a user to make a request to have modification rights to another user's folder over a network.

BACKGROUND

Individuals often wish to share digital files with others. In some cases, a particular individual may wish to simply share copies of files with others. In other instances, it may be desirable to allow others to modify centrally-stored copies of the files. There is currently a need for a system that allows individuals to share copies of files with others, and that optionally facilitates allowing certain recipients of the files to make changes to centrally-stored copies of those files. This can be useful in cases, for example, where it is desirable to have certain individuals collaborate to produce a particular file or collection of files, and to have other individuals monitor (but not participate in) the collaboration.

SUMMARY OF THE INVENTION

A computer-implemented method, according to various embodiments, provides a user of a file management system with the ability to allow certain recipients of a file sharing link to make changes to centrally-stored copies of the files. In various embodiments, the method comprises the steps of: (1) in response to a request from the link sharer, generating a file sharing link to a file set, wherein the link does not provide the link recipient with the ability to modify the file set; (2) receiving an indication that the file sharing link has been activated by a link recipient; (3) at least partially in response to receiving the link activation indication, displaying a representation of the file set along with a display element that may be activated to send a request to provide modification rights to the file set; (4) receiving an indication that the display element has be activated; and (5) at least partially in response to receiving the indication that the display element has been activated, granting modification rights to the file set.

In various embodiments, the granting of modification rights is automatically provided in response to determining that certain permission criteria have been satisfied. In other embodiments, the granting of modification rights is automatically provided in response to determining that at least one permission criteria has been satisfied, and the at least one permission criteria comprises one or more criteria selected from a group consisting of: (1) the link sharer and the link recipient are members of a common group on a social media web site; (2) the link recipient is within a list of contacts associated with the link sharer; and (3) the link sharer has previously manually granted the link recipient permission to directly upload files to the file set.

In some of these embodiments, membership in a common group further comprises the link sharer and the link recipient being members of the same social media group. In yet other embodiments, the method further comprises determining whether predetermined permission criteria that have been specified by the link sharer have been satisfied, and at least partially in response to determining that the permission criteria have not been satisfied, requesting authorization from the link sharer to grant the link recipient modification rights to the file set. In some embodiments, the file set is a shared folder within the context of a synched file sharing system. In some of these embodiments, the modify rights include one or more rights selected from a group consisting of: adding files to the shared folder; deleting files from the shared folder; and editing files that are stored within the shared folder. In various embodiments, the method is executed via computer-executable instructions stored on a computer-readable medium. In still other embodiments, one or more steps of the method are executed by one or more computer servers comprising at least one processor and memory.

In another embodiment, a computer implemented method of sharing files between a link sharer and a link recipient comprises the steps of: (1) at least partially in response to receiving a request to share a file set, generating a file set sharing link; (2) at least partially in response to receiving an indication that the file sharing link has been activated by a link recipient, displaying a representation of the linked file set and a display element that is configured to send a request for modification rights to the linked file set when activated by the link recipient; and (3) executing a step that selected from a group consisting of (i) automatically granting modification rights to the file set; and (ii) sending notice to the link sharer indicating that the link recipient is requesting modification rights to the linked file set.

In various embodiments, automatically granting modification rights to the linked file set is at least partially based on satisfaction of at least one permission criteria. In these embodiments, the at least one permission criteria is based on whether the link recipient is a registered user of a file sharing system. In still other embodiments, the file set is a shared folder that is shared among multiple users within the context of a synched file sharing system. In other embodiments, the method is executed via computer-executable instructions stored on a computer-readable medium. In yet other embodiments, one or more steps of the method are executed by one or more computer servers comprising at least one processor and memory.

In another embodiment, a system for sharing files across a network comprises at least one processor, and memory operatively coupled to the at least one processor. The at least one processor is configured to: (1) at least partially in response to receiving a request to share a file set, generate a file set sharing link; (2) at least partially in response to receiving an indication that the file set sharing link has been activated by a link recipient, display a representation of the linked file set along with a display element that may be activated by the link recipient to send a request for modification rights to the linked file set; and (3) one of (i) automatically grant modification rights to the linked file set;

and (ii) send notice to the link sharer indicating that the link recipient is requesting modification rights to the linked file set.

In various embodiments, the file set comprises one or more files associated with an account of the link sharer. In some embodiments, the modification rights provide the link recipient with at least one permission selected from a group consisting of: (1) the ability to add files to the file set; delete files from the file set; edit files in the file set; and move files between file sets. In still other embodiments, the link is further configured to facilitate allowing the link recipient to engage in an activity selected from a group consisting of: viewing one or more files in the file set; and downloading copies of the content locally to the link recipient's computer. In yet other embodiments, the automatic grant of modification rights to the linked file set is at least partially based on satisfaction of at least one permission criteria, and the at least one permission criteria is based on whether the link recipient's e-mail is included in a contact list associated with the link sharer. In various embodiments, the at least one processor is further configured to notify the link sharer when modification rights have been granted. In other embodiments, the at least one processor is configured to determine whether predetermined permission criteria that have been specified by the link sharer have been satisfied, and at least partially in response to determining that the permission criteria have not been satisfied, send the notice to the link sharer. In still other embodiments, the at least one processor is configured to: (1) determine whether predetermined permission criteria that have been specified by the link sharer have been satisfied, (2) at least partially in response to determining that the permission criteria have not been satisfied, send notice to the link sharer that a request for modification rights to the linked file set is pending approval, and (3) in response to receiving approval to grant modification rights to the file set from the link sharer, grant the link recipient modification rights to the file set. In several of these embodiments, the file set is a shared folder within the context of a synched file sharing system.

In another embodiments, a computer-implemented method of sharing one or more files between a link sharer and a link recipient, the one or more files being stored within a folder and the method comprises the steps of: (1) in response to a request from the link sharer, generating a link to the folder, wherein the link does not provide the link recipient with shared access to the folder; (2) receiving an indication that the link has been activated by the link recipient; (3) at least partially in response to receiving the link activation indication, displaying a representation of the one or more files along with a display element that may be activated to send a request to provide shared rights to the folder; (4) receiving an indication that the display element has be activated; and (5) at least partially in response to receiving the indication that the display element has been activated, granting the link recipient shared rights to the folder.

BRIEF DESCRIPTION OF THE DRAWINGS

Various embodiments of a computer system for storing requesting and providing modification rights to a linked file set are described below. In the course of this description, reference will be made to the accompanying drawings, which are not necessarily drawn to scale, and wherein:

FIG. 6 illustrates a user interface window showing the link generated for a shared file set in accordance with one embodiment of the present system;

FIG. 8 illustrates a browser window that presents shared files associated with a shared link in accordance with one embodiment of the present system;

FIG. 9 illustrates a user interface for sending a request to a link sharer to provide modification rights to a linked file set in accordance with one embodiment of the present system;

DETAILED DESCRIPTION

Figure 1:
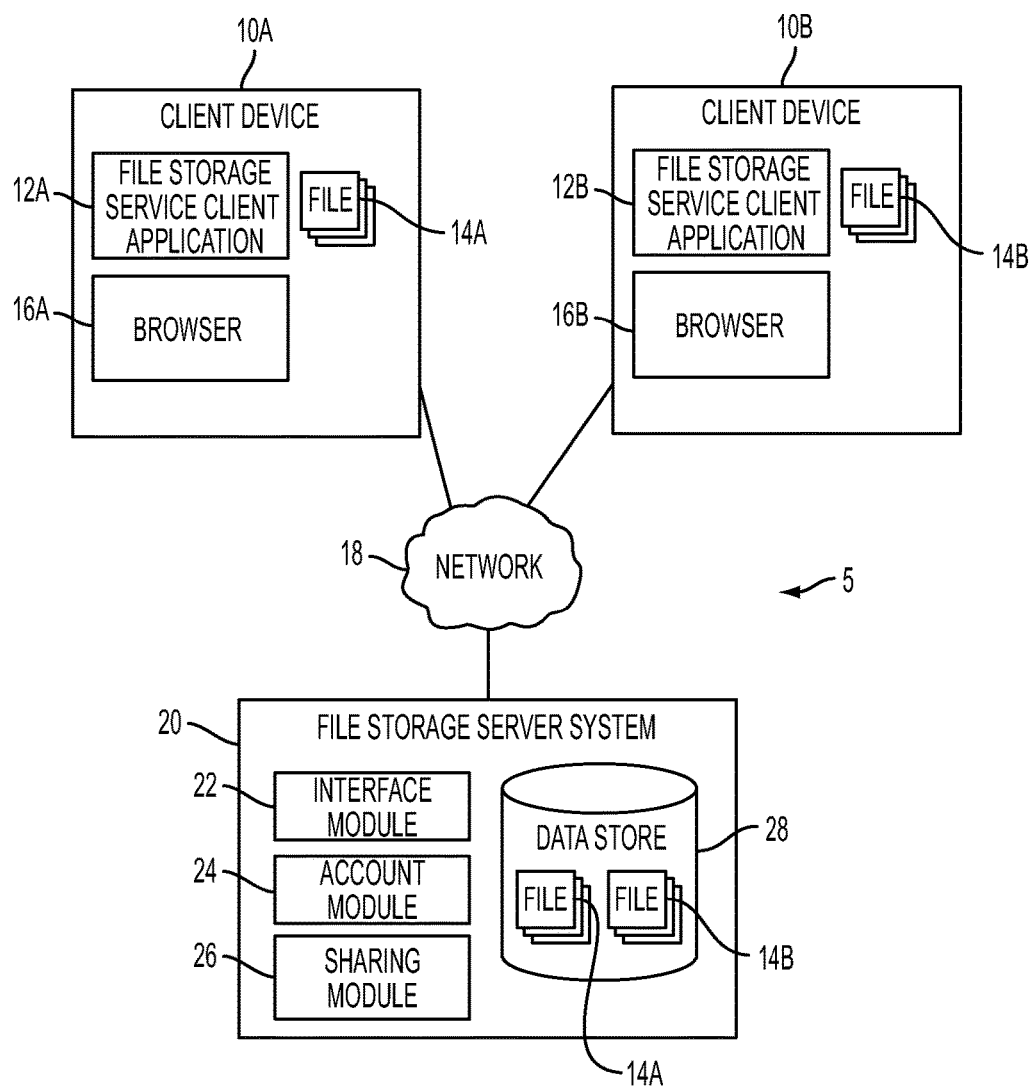
FIG. 1 is a block diagram of a file management system in accordance with an embodiment of the present system.

Various embodiments will now be described. It should be understood that the present system and method may be embodied in many different forms and should not be construed as limited to the embodiments set forth herein. Rather, these embodiments are provided so that this disclosure will be thorough and complete, and will fully convey the scope of the present system and method to those skilled in the art. Like numbers refer to like elements throughout.

System Overview

In various embodiments, a file sharing and retrieval system is provided that allows a first user (the "link sharer") to create a link that provides read-only access to one or more files, a folder, a group of folders or any other combination of files and folders (individually referred to as a "file set"). The reference to "read-only" access indicates that the link only allows a second user (hereinafter the "link recipient") to view the file set, but they cannot make modifications to the content of the file set—such as editing files, deleting files, adding files to the file set, or moving files between file sets. In various embodiments, the link may allow users to download a local copy of the files to their computer. However, downloading a local editable copy does not affect the link sharer's version of the file set, which may, for example, be stored in a shared folder.

In various embodiments, the link may, for example, be a URL or any other suitable indicia that includes a file path to the files and/or folders. Once created, the link sharer can share the link with the link recipient to allow the link recipient to view and/or download a local copy of the file set associated with the link to the link recipient's local computer. It should be understood from this disclosure that the link recipient cannot edit, delete, add or modify files in the file set associated with the link—hence the "read-only" designation.

Once the link recipient clicks on the link (if it is an active link) or copies the link and pastes it into their browser's address bar, a window opens allowing the file recipient to view the contents of the files and/or folders, or download a local copy of the files and/or folders to their computer. In addition to viewing and downloading the files, the window also provides the link recipient with the option to request modification rights to the linked file set. For example, if the link sharer is working with the link recipient on a project, the link sharer may want to share photos, notes, and data files associated with the project. In some cases, the link recipient may wish to have modification rights to the shared files to collaborate in a single set of files instead of e-mailing files back and forth with other individuals who collaborate on the files. Thus, when the link recipient activates the link, the file set viewing window includes a "share folder to collaborate" display element that allows the link recipient to request modification rights to the file set. For purposes of this disclosure, the term "display element" may refer to a soft button located on a website, a link, a dropdown box or any other selectable indicia displayed on a website, in a browser window and/or within a non-web-based user interface.

When the link recipient activates the "share folder to collaborate" display element, the file storage server system may either automatically provide the link recipient modification rights to the file set, or not act on the request until the link sharer manually provides modification rights to the link recipient.

The file storage server system may grant automatic modification rights to the file set based on one or more permission criteria that the link sharer sets up. Permission criteria may, for example, be defined globally as preferences by the link sharer, or established on a link-by-link basis permitting the link sharer both flexibility and efficiency during generation of the link. In various embodiments, permission criteria may include, for example: (1) the link sharer and the link recipient belonging to a common domain, social media collective or other user-defined group; (2) the link recipient's e-mail address being included in the link sharer's contact information or address book; or (3) the link recipient being a registered user of the file storage server system. In other embodiments, the criteria may be based on any number of other conditions determinable by the system. In various embodiments, if the specified criteria are met, modification rights to the linked file set is automatically provided to the link recipient. In other embodiments, the link sharer may specify that they must specifically authorize any modification rights to a linked file set within their account.

Exemplary System Platform

An exemplary platform for implementing various embodiments will now be discussed. Referring to FIG. 1, a system 5 implementing file set sharing and modification access requests through link sharing is shown having a plurality of client devices 10A and 10B (collectively 10) and a file storage server system 20, which are all interconnected by at least one network 18. Various aspects of client devices and file storage server systems are discussed below.

Client Devices

In various embodiments, each client device 10 has a file storage service client application 12A and 12B (collectively 12) through which respective files 14A and 14B of that client are specified for storage in file storage server system 20. It is noted that in some embodiments synchronized copies of files 14A and 14B may be kept on both file storage server system 20 and each respective client device 10. In some embodiments, client devices 10 may provide a file-browser type interface (not shown) for directly manipulating the files stored on file storage server system 20 without maintaining a local copy, such as on a handheld device such as a smartphone or tablet computer. Client devices 10 may also include a web browser 16A and 16B (collectively 16) for retrieving and presenting web pages and other content from webservers. Examples of suitable web browsers that may be used by client devices 10 include FIREFOX, GOOGLE CHROME, INTERNET EXPLORER, OPERA, and SAFARI. It should be understood by those skilled in the art that web browser 16 may optionally be used to access file storage server system 20 instead of using file storage service client application 12.

Still referring to FIG. 1, while only two client devices 10A and 10B are shown for purposes of clarity, it should be understood by those skilled in the art that many client devices may simultaneously connect through network 18 to file storage server system 20 at any given time. Examples of client devices 10 include, but are not limited to a desktop computer, a laptop computer, a tablet-computing device and a handheld computing device such as a personal digital assistant, a tablet computer or a smart phone (e.g., an IPHONE or BLACKBERRY, or a SYMBIAN or ANDROID-based smart phone). Each client device 10 may store one or more files on file storage server system 20, and the files may be stored in any file format. When file storage service client application 12 presents files to a user, the files may be arranged in folders and the folders themselves may be arranged in other folders, or in any other arbitrary arrangement supported by file storage server system 20, as determined by the user. However, one of skill in the art should understand in light of this disclosure that each user's file storage architecture may be considerably different from the next, and in some instances, the file storage architecture may be implemented to maximize storage and file retrieval efficiency.

File Storage Server System

File storage server system 20 stores files and manages access to those files using client devices 10. File storage server system 20 and its components may be implemented using any appropriate hardware and software for performing file serving, storage and retrieval functions. For purposes of clarity and ease of description, FIG. 1 illustrates an exemplary file storage server 20.

File Storage Server System—Interface Module

In various embodiments, file storage server system 20 includes an interface module 22, an account module 24, a link-based sharing module 26 and a data store 28. Interface module 22 facilitates file access and file storage between file storage server system 20 and client devices 10. Interface module 22 receives files from and sends files to client devices 10 consistent with the user's preferences for sharing files. Interface module 22 may act as the counterpart to a client-side file-explorer style user interface that allows a user to manipulate files directly stored on file storage server system 20. In some embodiments, software operating on client devices 10 integrates network-stored files with the client's local file system to enable a user to manipulate network-stored files through the same user interface (UI) used to manipulate files on the local file system, e.g., via a file explorer, file finder or browser application. As an alternative or supplement to the client-side file-explorer interface, user interface module 22 may provide a web interface for client devices 10 to access (e.g. via browser 16) and allow a user to manipulate files stored on file storage server system 20. In this way, the user can directly manipulate files stored on file storage server system 20.

File Storage Server System—Data Store

In various embodiments, data store 28 stores files such as those uploaded using client devices 10. In the embodiment illustrated in FIG. 1, client 10A for a first user (e.g. link sharer) has stored files 14A and client 10B for a second user (e.g. a link recipient) has stored files 14B, which are stored in data store 28. Copies of stored files 14A and 14B may also be locally stored on respective client devices 10. Data store 28 maintains, for each user, information identifying the user, information describing the user's file directory, etc. in a file journal that is maintained for each user. In some embodiments, the file journal is maintained on file storage server system 20. This file journal may be updated periodically using information obtained directly from the file storage server system 20 and/or from information obtained from one or more client devices 10. In this way, the server-stored file journal on file storage server system 20 (hereinafter the "server-side file journal") is updated when a file is changed at the server or on the local client. The file storage server system 20 then communicates with one or more clients devices 10 to assure that any relevant changes are reflected locally. For example, if a particular user makes a change to a particular file on a first client device, the change will be reflected in the server-side file journal, and the server-side file journal will be used to propagate the changes so that they are reflected both on the file storage server system 20 and on all client devices associated with the user. Such techniques may be implemented within the context of a synchronized file system such as the DROPBOX service of Dropbox, Inc. of San Francisco, Calif.

File Storage Server System—Account Module

Account module 24 tracks files stored in data store 28 and entries in the server-side file journal for each file. As users grant file access permissions to other users, account module 24 updates the server-side file journal associated with each user in data store 20. Account module 24 may also track client devices 10 that are associated with each user's account. For example, a user may want to share all their files between their desktop computer, tablet computer, and handheld device. To make such a sharing arrangement seamless to the user, the user's single account on file storage server system 20 is associated with each of the user's respective client devices by creating a new file reference string for each respective device and storing the file reference string in the user-associated server-side file journal. In this way, system 5 can determine which client device is requesting retrieval of the file. Additionally, in some embodiments where a copy of the file is stored on file storage server system 20 and locally on each client device, a separate client-side file journal is maintained on each client device to allow synchronization between and among the various client devices and file storage server system 20. In some embodiments, an application running on client device 10 manages synchronization of the client-side file journal with the server-side file journal in order to maintain synchronized local stored files with the server stored files.

File Storage Configuration

Figure 2A:
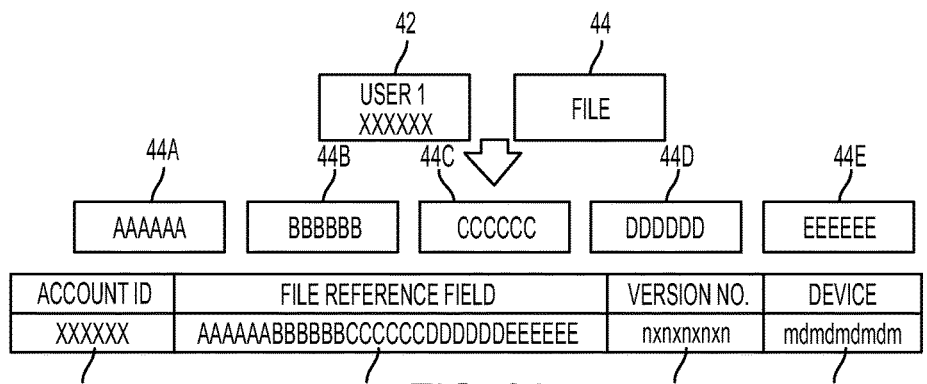
FIGS. 2A-2B are schematic representations of one embodiment of how files are segmented and stored in the file management system of FIG. 1.

Referring to FIG. 2A, to expedite file handling and updating, in one embodiment, files stored in data store 28 are segmented. That is, when user 42 uploads the file to data store 28, file storage server system 20 is configured to segment the file into file segments 44A-44E and to assign a unique identifier to each file segment. In one embodiment, the file segments may be four (4) megabytes in size, but it should be understood by those skilled in the art in light of this discussion that the size of the file segments can be of any suitable size. In one embodiment, first file segment 44A is assigned a unique identifier AAAAAA, file segment 44B is assigned identifier BBBBBB, and so forth. In one embodiment, the unique identifier is a hash value calculated for each file segment using one or more hashing methods. In some embodiments, the file segments are stored in memory for later retrieval of the file by a user. That is, the file is stored as segments each having a unique identifier associated with the file that provides the identity and location of the file segment. To retrieve the file, the system may be adapted to use the respective unique identifiers for the various file segments to retrieve each file segment and then reconstruct the file for use by the user.

In various embodiments, file storage server system 20 is also configured to create a unique file reference string 46 for each file by concatenating file segment identifiers 44A-44E. User identifier XXXXXX and file reference string 46 are placed in a file journal entry 48. It should be understood that other information such as a version reference 50 and device reference 52 may also be included in file journal entry 48. In still other embodiments, information (metadata) related to the file and its content (e.g., image orientation, pixel resolution and file type if the file is an image) may also be included in the file journal entry to properly orient and process the file for ease of viewing. Those skilled in the art will understand from this disclosure that any information associated with a file might be included in file journal entry 48 to enhance the features of the present system. In yet other embodiments, file journal entry 48 may be entered into a single server-side file journal that is used for all users. In yet other embodiments, the system may assign each user their own server-side file journal so that only file journal entries for each file associated with that user are stored in their respective server-side file journal.

Figure 2B:
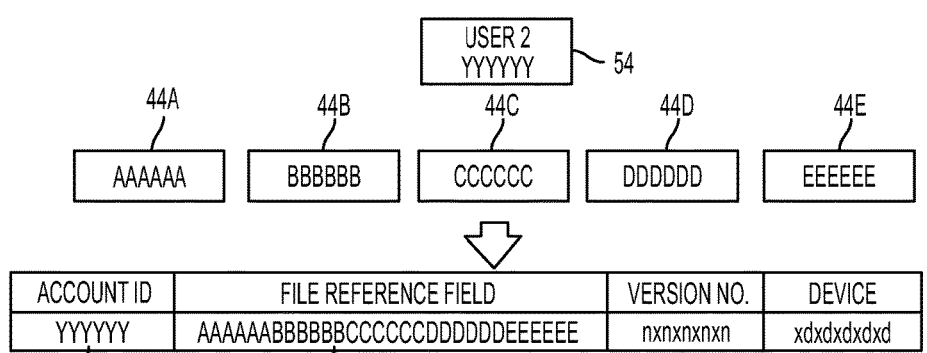

Referring to FIG. 2B, when file 44 is shared with another user 54 having a unique user ID YYYYYY, in one embodiment, file storage system 20 is further configured to create another file journal entry 56 that associates file reference string 46 with the unique user identifier YYYYYY for user 54. Thus, when another user 54 is granted access to a file, it is unnecessary to store additional copies of the file in data store 28. Instead, when the other user clicks the file link, file journal entry 48 is used to reconstruct the file. That is, file storage server system 20 breaks the concatenated file journal entry 48 into its constituent parts and uses the unique segment identifiers to retrieve the various file segments that constitute the file. File storage server system 20 reconstructs the file from the various file segments and displays the file to the requesting user. It should be understood based on this disclosure to those skilled in the art that other efficient methods of file storage and user association may be used within the context of the present system and are within the scope of the disclosed system.

File Storage Server System—Sharing Module

In various embodiments, the link sharer can select any, or any combination of, a single file, multiple files within a folder, an empty folder, multiple folders, or multiple files across multiple folders (individually and collectively a file set) to be shared with one or more other users. It should be understood that when multiple files across multiple folders are shared as a file set, that file set defines a virtual folder for those files.

Figure 3:
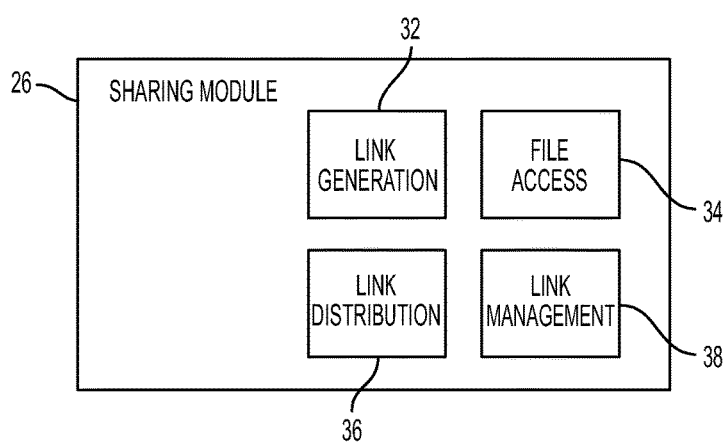
FIG. 3 is a block diagram of a sharing module for use in the file management system of FIG. 1.

Referring to FIG. 3, a block diagram illustrating the components of a link-based sharing module 26 in accordance with embodiments of the present system is shown. Link-based sharing module 26 enables a user to provide others access to the user's file sets through a shared link. Link-based sharing module 26 comprises a link generation module 32 for generating links to the shared file sets, a file access module 34 for accessing the files via the generated links, a link distribution module 36 for facilitating distribution of links to other users, a link management module 38 for viewing generated links and database 40 that maintains information about linked file sets and related information such as corresponding sharing links.

Link generation module 32 is configured to generate a link corresponding to the file set specified by the user. In one embodiment, upon receiving a request to share a particular file set, link generation module 32 generates the unique file set descriptor of the shared file set and a unique file location path or URL that serves as the link. Sharing module 26 saves an association of the file set descriptor and the file location path or URL to data store 28. In some embodiments, the generated file sharing link is independent of the file set descriptor so that the file set descriptor cannot be inferred from the file sharing link, and vice versa. An independent file set descriptor and file location path or URL prevents malfeasance by making it essentially impossible to guess or reverse engineer a sharable link. As an example, when sharing a folder "Reunion" with a file ID of 3D8B99, link generation module 32 might generate a unique (e.g., one-way pad, or a pseudo-random value) URL https://www.service.com/s/2608u2mnco/BBQ.pdf, where the URL component 2608u2mnco cannot be reverse-engineered, and accordingly create an entry <3D8B99, https://www.service.com/s/2608u2mnco/BBQ.pdf> in data store 28. In one embodiment, the generated link can further be shortened. In some embodiments, the generated URL https://www.service.com/s/2608u2mnco/BBQ.pdf can further be shortened using a link-shortening service to a shorter URL (e.g., http://db.tt/xOFounw), and an additional association between the original link and the shortened link can be added to data store 28. In another embodiment, the file set can be directly associated with the shortened link rather than with an intermediate, longer generated link.

In still other embodiments, a user can generate multiple different links to the same file set. Thus, the user can more selectively control access to the file set by distributing different selections from among the multiple different links to different link-recipients or sets thereof. This may, for example, allow a user to revoke certain users' access to the file set while continuing to permit other users to access the file set (e.g., by deactivating certain users' links to the file set while maintaining other users' links in active status).

Moreover, since a file set link is versatile, in some embodiments, the system may include reference to a particular relevant application, or applications, in a link by embedding an application identifier in the generated link. As an example, the generated link for a given file set could be the URL https://www.service.com?app=1ps3q/s/2608u2mnco/BBQ.pdf, which specifies (via the portion "app=1ps3q") that some application uniquely associated with the identifier "ips3q" (e.g., Microsoft Word or Microsoft Visio) should be used to view the file set. Alternatively, the association between the link and the application or application plug-in can be made as an entry in the data store 28 itself, rather than by including an application identifier in the link. For example, in various embodiments, a user may generate a first link to a file set that specifies use of a first application for viewing the file set, and a second link that specifies use of a second application for viewing the file set. In this example, the data store 28 would in turn contain two corresponding entries: i.e., <file set identifier, first link identifier, first application identifier> and <file set identifier, second link identifier, second application identifier>. In another embodiment, link-based sharing module 26 may be configured to select the proper applications or application plug-ins to use in the file browser, e.g., based on the types of files in the file set. The link-based sharing module 26 may also allow users to specify which application should open a particular file or set of files when the files are accessed via a particular link.

Exemplary System Operation

Figure 4:
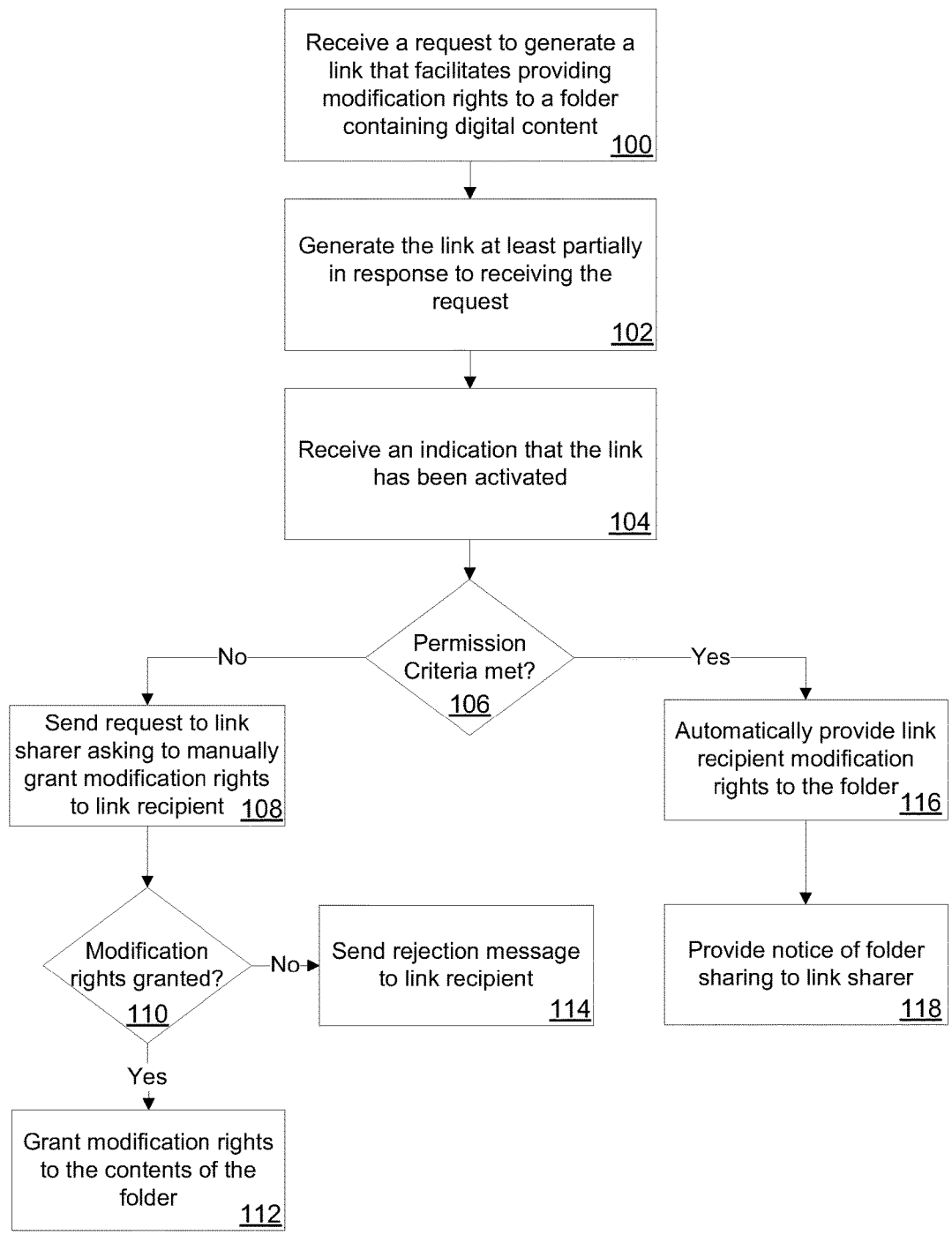
FIG. 4 depicts a flow chart that generally illustrates various steps executed by a file sharing system for requesting modification rights to a linked file set from a shared link in accordance with one embodiment of the present system.
Figure 5A:
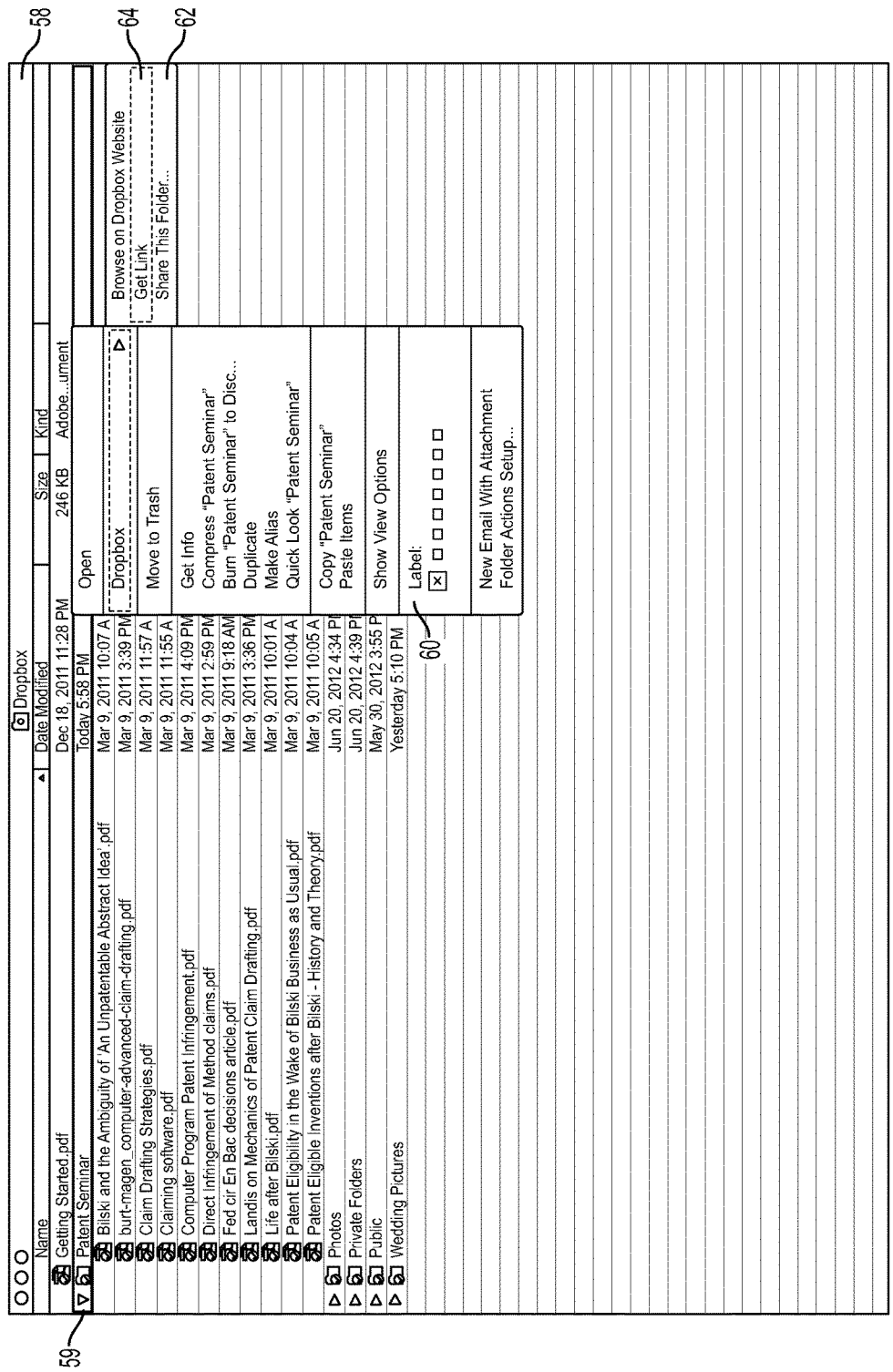
FIG. 5A illustrates one embodiment of a user interface menu for creating a file-sharing link for use in the file management system of FIG. 1.
Figure 5B:
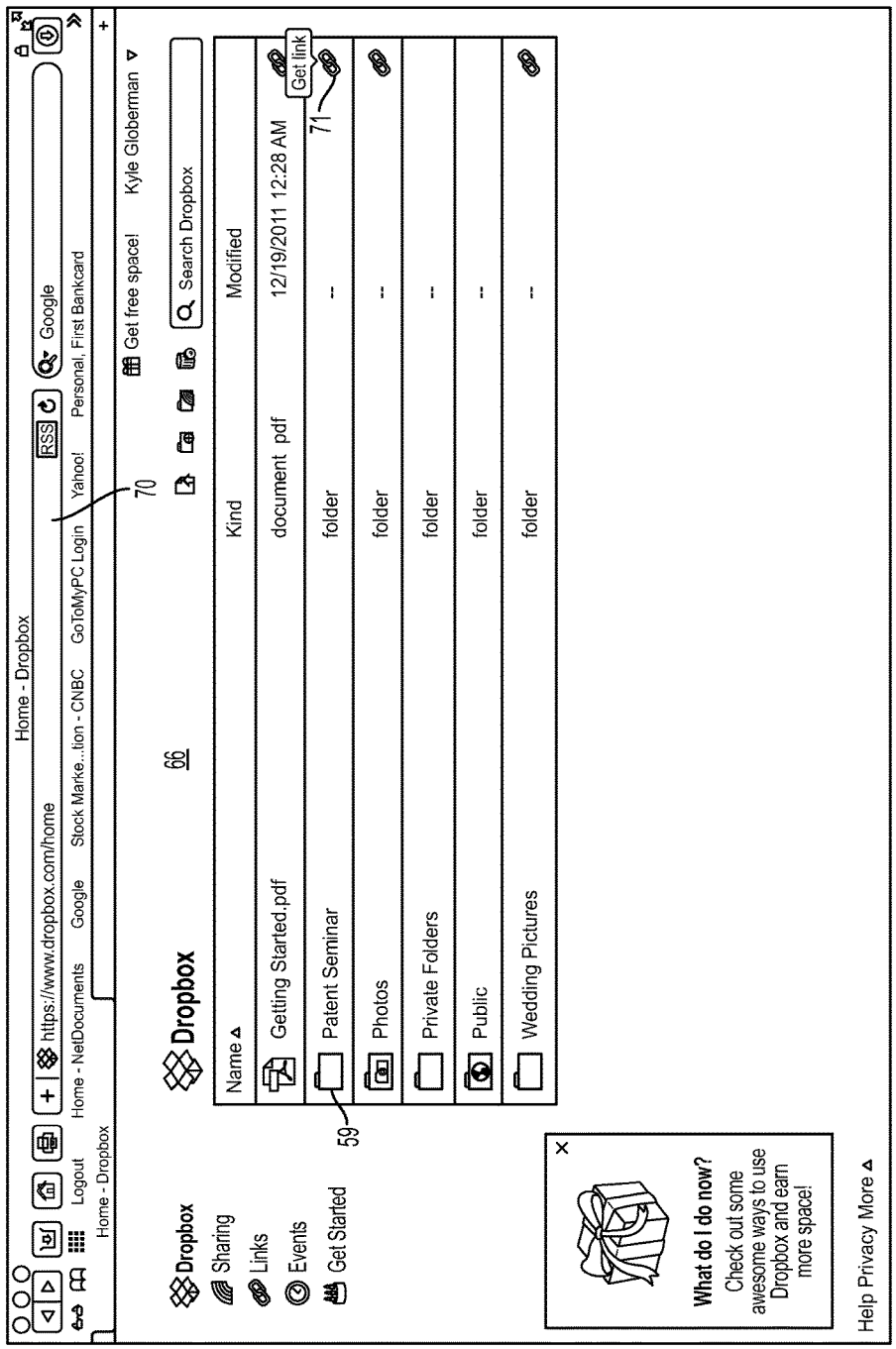
FIG. 5B illustrates another embodiment of a user interface for creating a file sharing link for use in the file management system of FIG. 1.

FIG. 4 depicts a method for allowing a link sharer to provide a link recipient a means to request modification rights to a linked file set, which may contain, for example, various digital files and folders. The system may do this by generating a link that the link sharer sends to the link recipient, and which the link recipient uses to request modification rights to the linked file set. In various embodiments, the link facilitates a modification rights request to a particular folder (or group of files) specified by the link-sharer.

Beginning at step 100, the file storage server system 20 (FIG. 1) receives a request, from a link sharer, to generate a link to a file set. At step 102, at least partially in response to receiving the request, the file storage server system 20 generates a link. The link sharer may then share the generated link with a link recipient. Next, at step 104, the file storage server system 20 receives an indication that the link has been activated. The link is configured to cause the file storage server system to allow the link recipient to request modification rights to the linked file set (e.g., to a specified folder within the link sharer's account). Such modification rights may, for example, provide the link recipient with the ability to read files, edit files, delete files, add files and move files associated with the linked file set stored on the file storage server system. As indicated in FIG. 4 at step 106 the file storage server system checks at least one permission criteria to determine whether the link sharer will automatically provide the link recipient modification rights to the linked file set based on one or more criteria that the link sharer sets. The link sharer may define such criteria globally as preferences, or may establish the criteria on a link-by-link basis. In various embodiments, suitable permission criteria may include, for example: (1) the link sharer and the link recipient belonging to a common domain, social media collective or other user-defined group; (2) the link recipient's e-mail address being included in the link sharer's contact information or address book; or (3) the link recipient being a registered user of the file storage server system. In other embodiments, the criteria may be based on any number of other conditions determinable by the system. In various embodiments, if the specified criteria are met, modification rights to the linked file set is automatically provided to the link recipient. In other embodiments, the link sharer may specify that they must specifically authorize any modification rights to a linked file set within their account. Thus, at step 116, if the permission criteria are met, the file storage server system automatically grants the link recipient modification rights to the linked file set, and at step 118 provides a notice of the grant of modification rights to the link sharer.

Otherwise, in step 108, the file storage server system sends a message to the link sharer indicating that the link recipient has requested modification rights to the linked file set. At step 110, the file server storage system checks whether the link sharer has manually granted modification rights to the link recipient (which the system may facilitate by displaying an appropriate message to the link sharer indicating that a request for modification rights has been made and is awaiting approval). In step 112, if the link sharer accepts the request, the file storage server system grants the link recipient modification rights to the linked file set and notifies the link recipient. Otherwise, at step 114, the file storage server system sends a modification rights request rejection notice to the link recipient to indicate that the link sharer will not grant modification rights to the linked file set. In particular embodiments, if modification rights are not granted within a predetermined period of time (e.g., within 2 weeks), the system automatically discards the request.

It should be understood that the various steps described herein may vary in the context of different embodiments and that certain steps may be omitted and other steps may be added.

Example User Experience

The following exemplary user experience is described in reference to a file sharing system provided by Dropbox, Inc. of San Francisco, Calif. (hereinafter DROPBOX). However, it should be understood after review of this disclosure by those of skill in the art that the functionality described herein may be used with other file sharing systems. FIGS. 5-12 are computer screen shots that may be used to understand the experience of a link sharer and link recipient as they use a system according to an embodiment of the present system and method.

Link Sharing

A link sharer may generate a link via link generation module 32 (FIG. 3) in different manners depending on the configuration of file server storage system (FIG. 1). In one embodiment and referring to FIG. 5A, the link sharer may generate a link using file storage service client application 12 provided on client device 10. That is, when a user right clicks on a file set 59 to be shared, menu screen 60 opens allowing the user to select a DROPBOX option, thereby opening a second, context-sensitive menu 62. From second menu 62, the link sharer selects a get link menu item 64. In still another embodiment illustrated in FIG. 5B, the link sharer opens a client interface in a browser window 66 and logs into their account, for example an account with DROPBOX service. In doing so, the link sharer can view stored files and folder in their account. Adjacent to some of the files and folders are link icons 71 that allow the link sharer to generate a link to a file, set of files and/or folders in the link sharer's account.

Referring to FIG. 6, once get link menu item 64 (FIG. 4A) or get link icon 71 (FIG. 4B) is selected, a browser window 66 opens displaying selected file set 59 in a file listing area (not numbered). Generated link 68, for shared file set 59, is displayed in browser address window 70. In some embodiments, a link sharing e-mail option 75 is presented to allow the link sharer to send the link via a local e-mail client on client device 10, or through an server side e-mail client that is part of file storage server system 20. In other embodiments, a link sharing option area 76 is displayed that allows the user to share the link using a social media program, for example, FACEBOOK or TWITTER. Selection from link sharing option area 76 prompts the link sharer for their login information for the selected service. Assuming that correct login information is provided, link distribution module 36 uses an application-programming interface ("API") of the selected service to disseminate the link via the service, such as by adding it as a post to the link sharer's page on a social networking service (e.g. Facebook), or by sending it as part of a textual message on a micro blogging service (e.g. Twitter). It should be understood that generated link 68 could be shared by copying the link and posting it on a webpage or through any other suitable sharing means.

Link Activation

Figure 7:
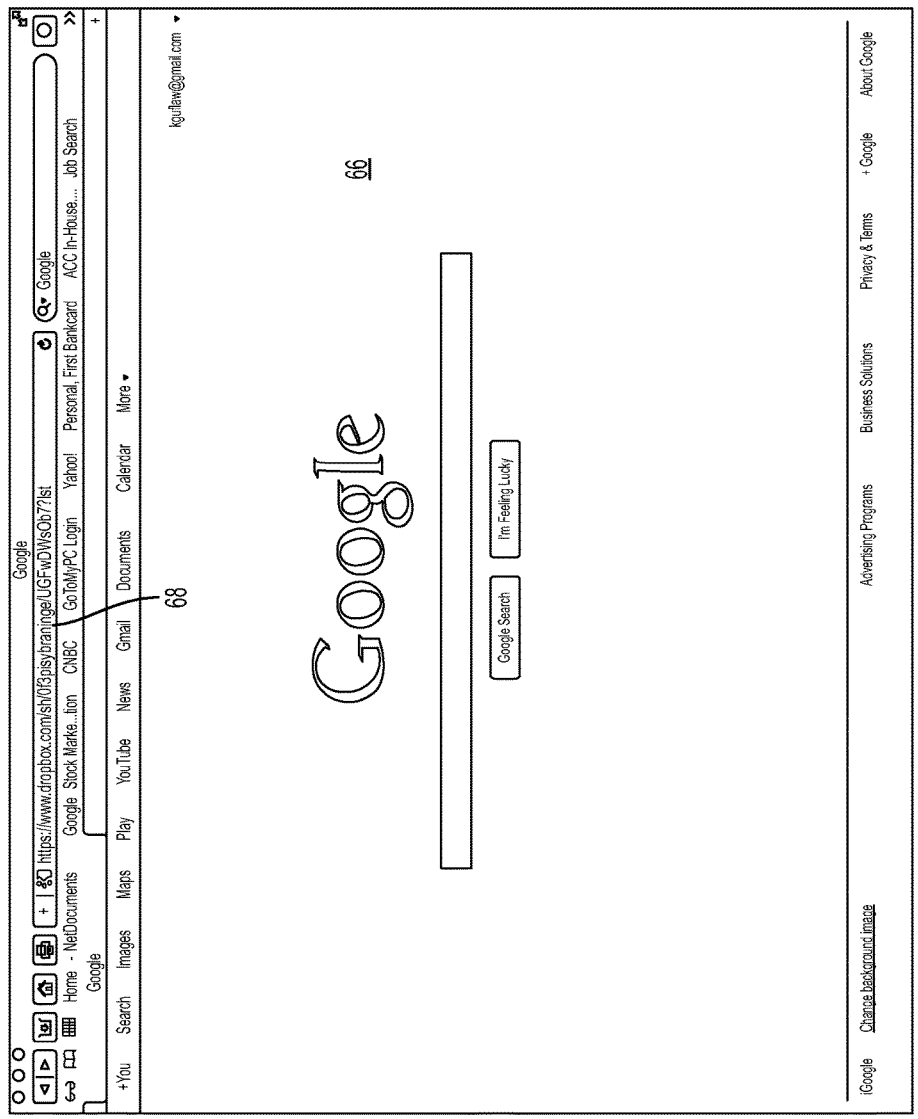
FIG. 7 illustrates one embodiment of a browser window that can be used to activate a shared file link in accordance with one embodiment of the present system.

Once the link recipient receives the link, the link recipient may, for example, select (e.g., click on) the link if it is an active link or, referring to FIG. 7, the link recipient may copy the link and paste it into their browser's address bar. Upon entering link 68 in the browser's address bar, referring to FIG. 8, file access module 34 (FIG. 3) provides the shared file set and/or visual representations thereof to client 10 in response to the link recipient activating the generated link. That is, client 10 sends a corresponding request to link-based sharing module 26 (FIG. 3). The request is handled by file access module 34, which locates the entry in the data store 28 using the parameters contained within the link, and extracts the associated file set identifier. File access module 34 then displays a representation of the file set that corresponds to the file set identifier by displaying file set 59 in browser window 66. In one embodiment, file access module 34 displays the representation of the file set using an application or application plug-in corresponding to a unique identifier embedded within, or otherwise associated with, the generated link, as described above.

Figure 8:
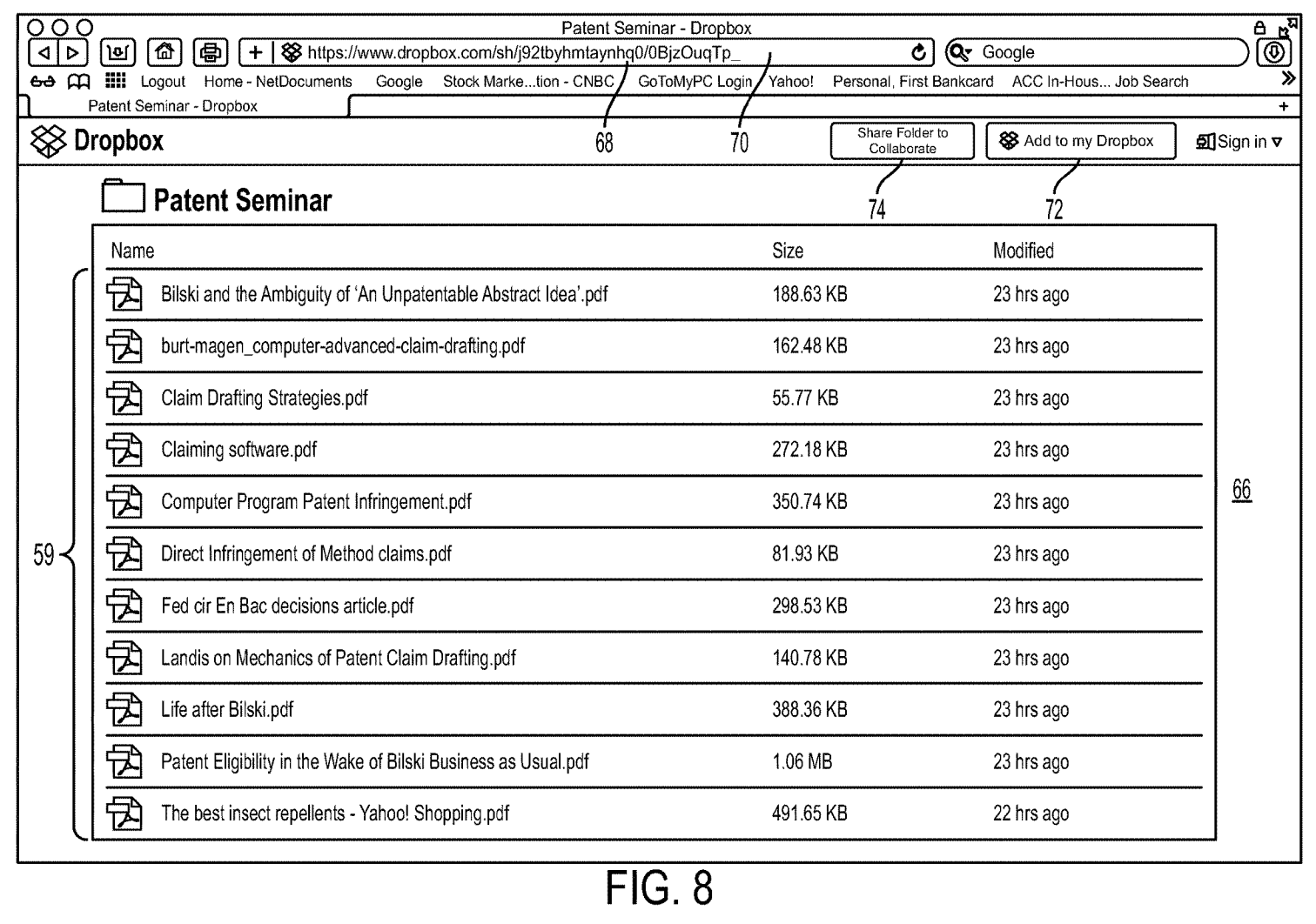

Still referring to FIG. 8, browser window 66 may also include a "share folder to collaborate" display element 74 that allows the link recipient to make a request to the link sharer to provide modification rights to the linked file set. For example, the link sharer may share one or more files to presentations from an event such as a patent seminar, and send the generated link to various link recipients that may have attended the seminar. The link recipients may review the linked file set and/or download the linked file set to their account using add to my DROPBOX display element 72, but cannot make changes to file set 59 in the link sharer's account. Said another way, while the link recipient can view and download a copy of file set 59 to their DROPBOX account or locally to their client device 10 and make changes to the local copy, they cannot collaborate with the link sharer by adding, deleting or editing the files in the link sharer's account. Thus, in various embodiments, after the link recipient reviews file set 59, the link recipient may make a request to the link sharer to provide modification rights to file set 59 by clicking "share folder to collaborate' display element 74. In this way, link recipients may use the generated link to request modification rights to the linked file set without having to send a request or make contact outside file storage server system 20.

Figure 9:
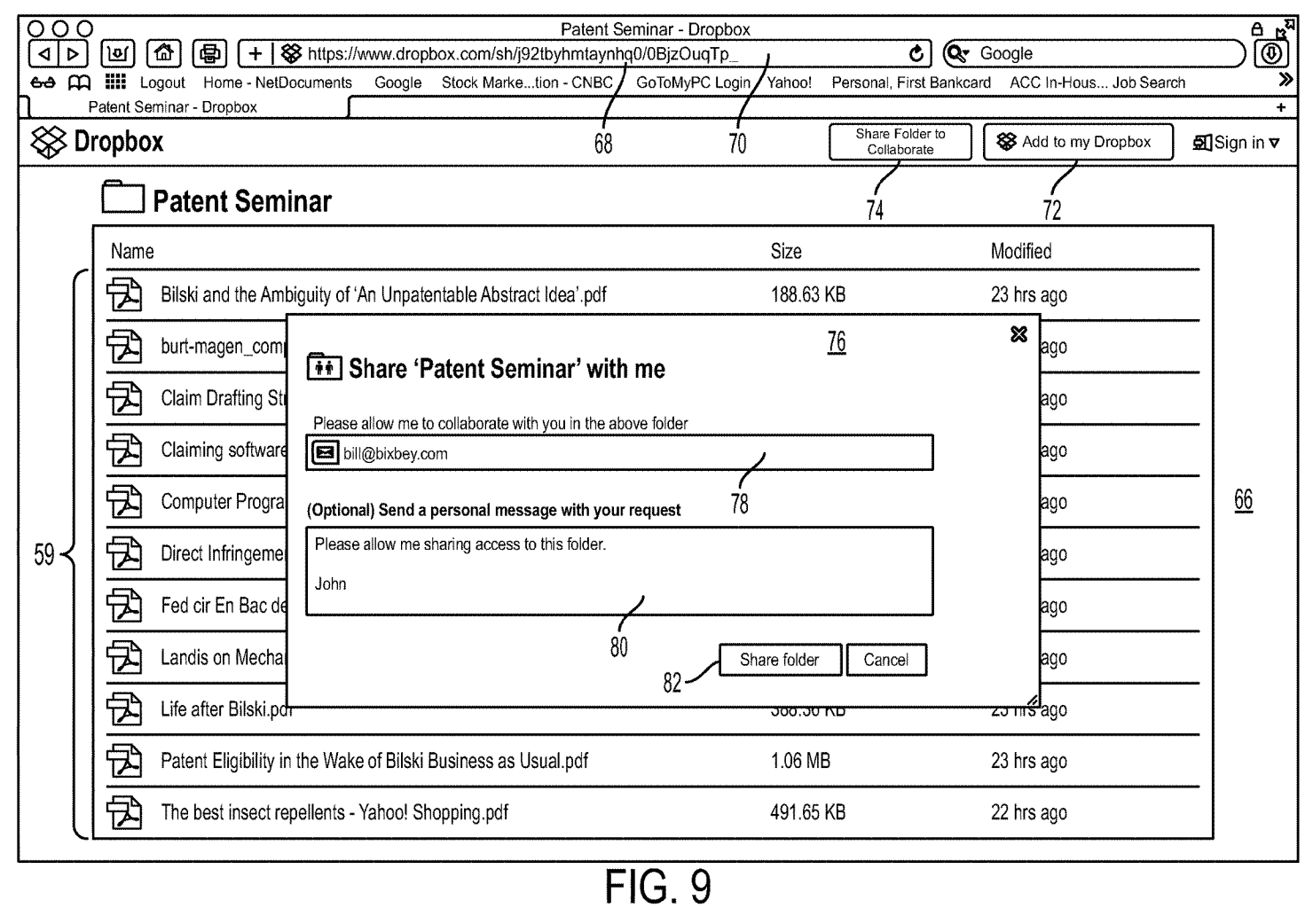

Referring to FIG. 9, once the link recipient clicks "share folder to collaborate" display element 74, a request dialog box 76 opens. Request dialog box 76 provides the link recipient with input area 78 to list the link sharer's e-mail address, and input area 80 where the link recipient can send a personal message to the link sharer. Once input areas 78 and 80 are completed, the link recipient clicks "share folder" display element 82 to send the message to the link sharer. In some embodiments, dialog box 76 may be a system e-mail client associated with file storage server system 20, and in other embodiments, dialog box 76 may be an e-mail associated with a local e-mail client on client device 10. In yet other embodiments, an e-mail request may not be used, and instead, only a request notice may appear in the link sharer's account (e.g. as shown in FIG. 11).

Figure 10:
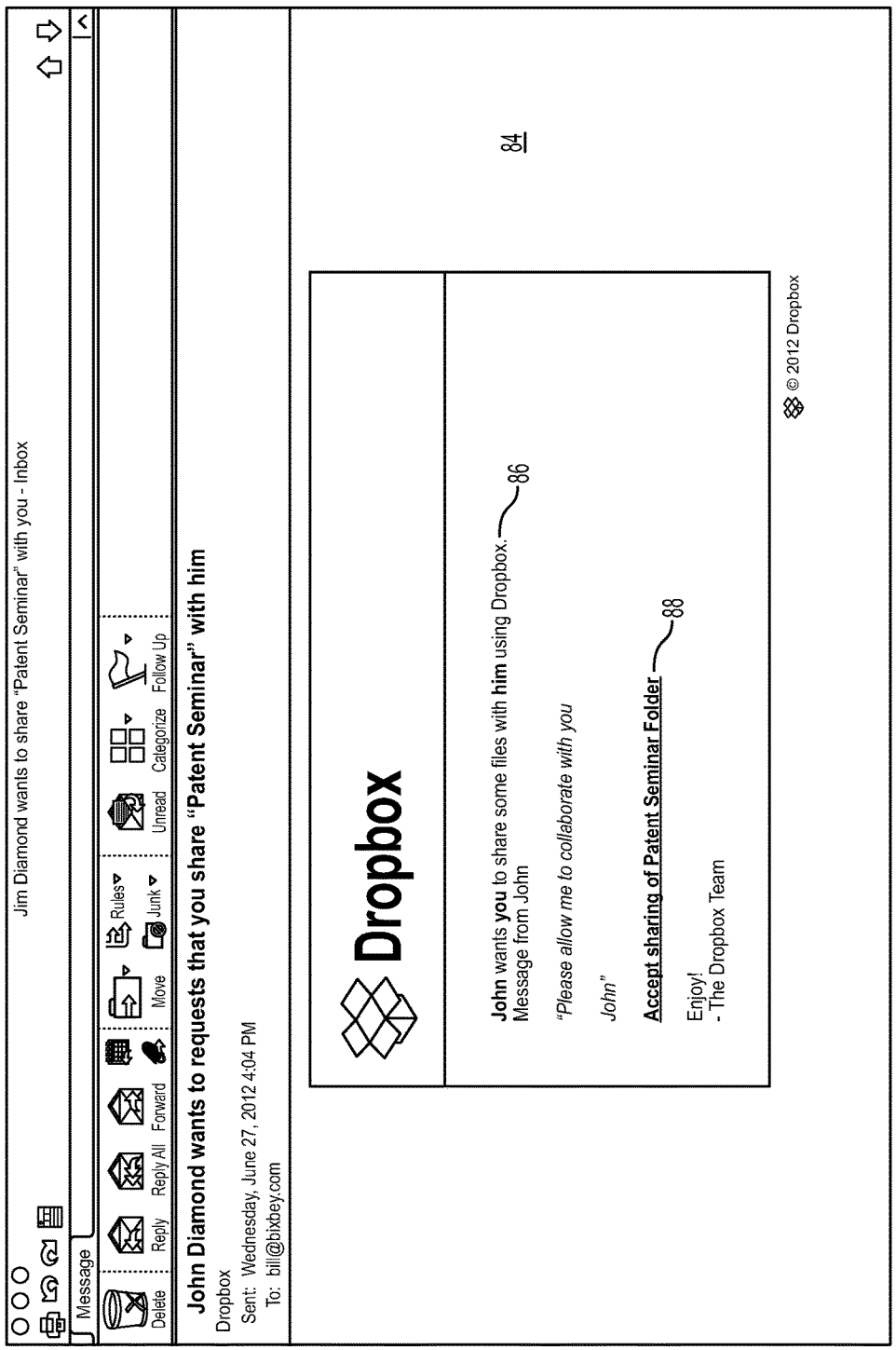
FIG. 10 illustrates one embodiment of a message that is sent to a link sharer requesting modification rights to the linked file set in accordance with one embodiment of the present system.

Referring to FIG. 10, once the link recipient clicks share folder display element 82 (FIG. 9), an e-mail message 84 is sent to the link sharer. While e-mail message 84 may contain various information regarding the request to provide modification rights to the linked file set, in one embodiment, e-mail message 84 contains a message 86 indicating that the link recipient is requesting modification rights and an active link 88, that when clicked, will bring the link sharer into their DROPBOX account.

Figure 11:
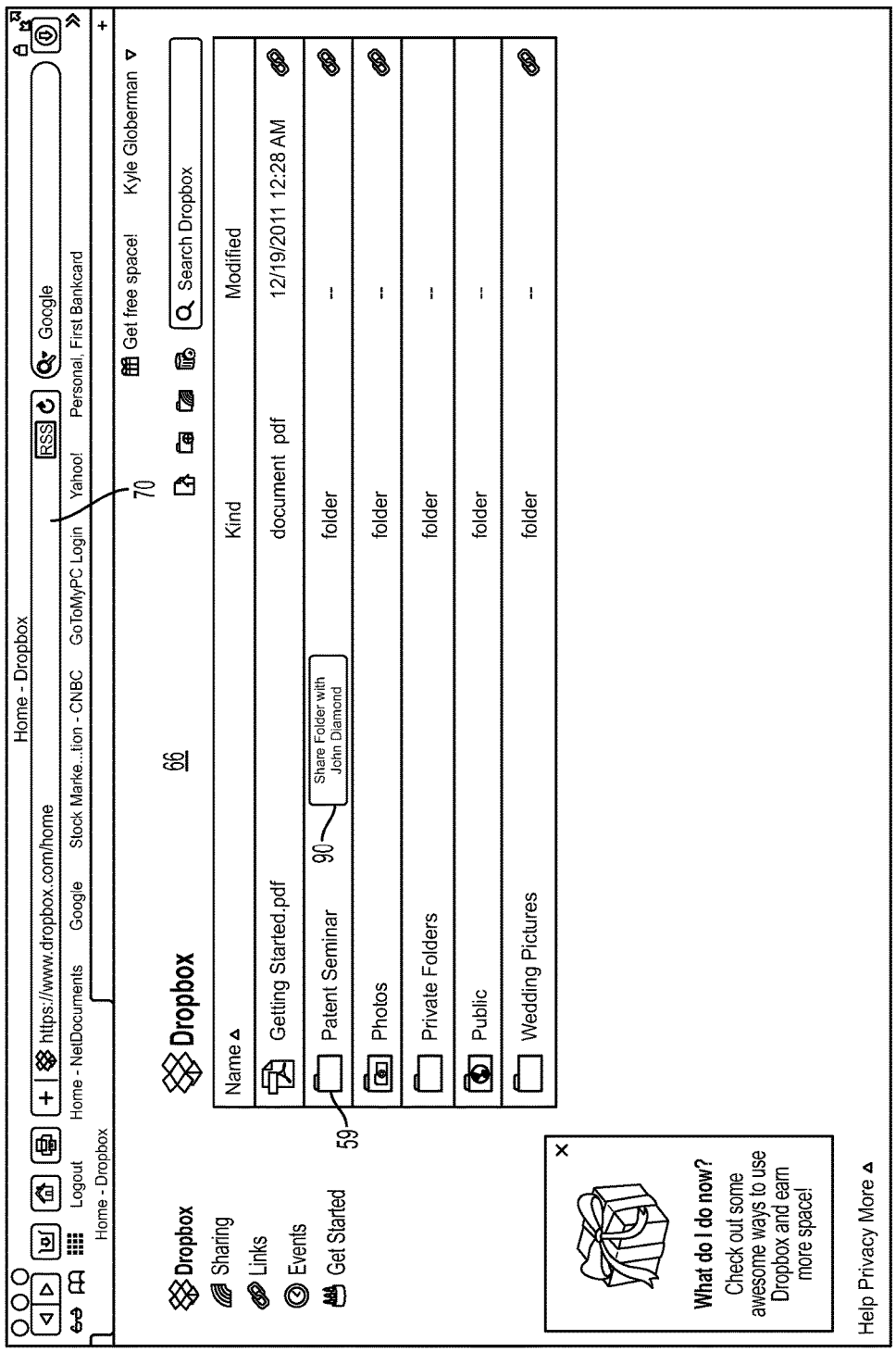
FIG. 11 illustrates the user interface of FIG. 4B indicating that modification rights have been granted to the linked file set in accordance with one embodiment of the present system.
Figure 12:
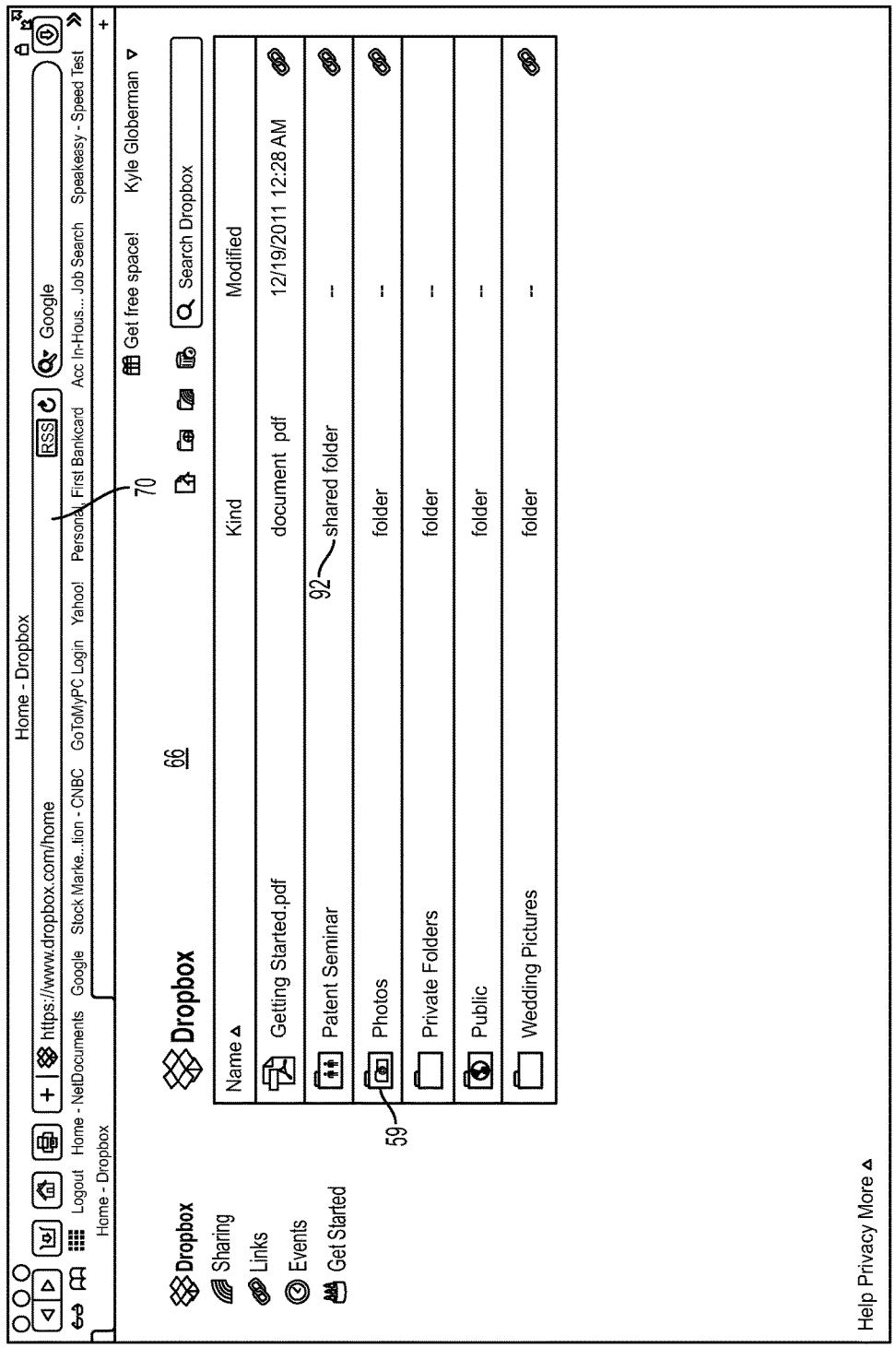
FIG. 12 illustrates a user interface that provides an indication to show a user that they granted modification rights to a linked file set in accordance with one embodiment of the present system.

Referring to FIG. 11, when the link sharer activates link 88 in e-mail message 84 (FIG. 9), a browser window 66 opens displaying the contents of their DROPBOX account. In various embodiments, the browser interface window looks similar to that shown in FIG. 4B, except that a share folder button 90 is presented that, when clicked, allows the link sharer to provide modification rights to linked file set 59. In particular embodiments, modification rights are granted within the context of a synched file system such as the DROPBOX service by, for example, using a folder sharing system. An example of a suitable folder sharing system is described in the following patent applications, which are each hereby incorporated herein by reference in their entirety: (1) U.S. Patent Application No. 61/233,787, entitled "Systems and Methods for Sharing Data," which was filed on Aug. 18, 2009, and (2). U.S. patent application Ser. No. 12/856,581, entitled "Network Folder Synchronization", which was filed on Aug. 13, 2010.

Permission Criteria for Automatic Modification Rights Grant

As noted above, in various embodiments, the link sharer might set up certain permission criteria that allows automatic acceptance of requests for modification rights to the linked file set by the link recipient. For example, when the link sharer has a pre-established relationship with the link recipient, the granting of modification rights may be automated based on one or more file-sharing criteria that the link sharer sets up. Such criteria may be defined globally as preferences by the link sharer, or established on a link-by-link basis permitting the link sharer both flexibility and efficiency during generation of the link. In various embodiments, permission criteria may include, for example: (1) the link sharer and the link recipient belonging to a common domain, social media collective or other user-defined group; (2) the link recipient's e-mail address being included in the link sharer's contact information or address book; or (3) the link recipient being a registered user of the file storage server system. In other embodiments, the criteria may be based on any number of other conditions determinable by the system. In various embodiments, if the specified criteria are met, modification rights to the linked file set is automatically provided to the link recipient. In other embodiments, the link sharer may specify that they must specifically authorize any modification rights to a linked file set within their account.

For example, in some embodiments, the generated link may contain an indicator that only allows a specific link recipient to activate the shared link. In certain embodiments, the generated link may contain information that requires the link recipient to be a registered user of file storage server system 20. In this way, file storage server system 20 may verify the identity of the link recipient based on their log in information, which allows the link sharer to eliminate unauthorized use of the link. Thus, if the link sharer sets a permission criteria with file server storage system 20 that indicates that automatic modification rights may be granted to the link recipient, then as soon as the link recipient clicks "share folder to collaborate" display element 74 (FIG. 7), file set 59 converts into a shared folder providing the link recipient with modification rights.

In still other embodiments, file storage server system 20 may be configured to verify link recipient information with the link sharer's contact information stored locally on client 10 or remotely on file storage server system 20. Thus, when a link recipient clicks the "share folder to collaborate" display element 74 (FIG. 7), file storage server system 20 confirms that the link recipient is a member of the link sharer's contacts by checking, for example, that the link recipient's e-mail address and/or domain is contained in the link sharer's contact information. If the requisite criteria exist, file storage server system 20 will automatically grant the link recipient modification rights to the linked file set 59.

It should be understood by those skilled in the art that the determination as to whether one or more permission criteria are satisfied may be made based on, for example: (1) information contained in one or more cookies stored on the link recipient's client device 10, or metadata contained therein, (2) information related to common membership in a social media group (e.g. FACEBOOK or YAHOO groups), or (3) any other suitable criteria that allows the link recipient to be verified as a safe collaborator. For example, in the case of using cookie information to identify the link recipient, in one embodiment, file storage server system 20 can use session identification information contained in the cookie as a means of verifying the identity of the link recipient.

CONCLUSION

Many modifications and other embodiments of the invention will come to mind to one skilled in the art to which this invention pertains having the benefit of the teachings presented in the foregoing descriptions and the associated drawings. It should also be understood that, although various embodiments are described above as using a link (e.g., a URL) to provide user access to shared file set, any other suitable indicia may be used for this purpose such as a link that includes a file path to the file set.

Various embodiments are described above as being adapted: (1) to automatically accept requests for modification rights to a particular linked file set if certain criteria are met; and (2) if the criteria are not met, to require manual acceptance of such requests. However, it should be understood that, in certain embodiments, the request acceptance process may either be entirely automatic or entirely manual.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed:

1. A method comprising:
determining, by a content management system, that a first user account having read-only access to a content item stored on the content management system and shared with the first user account by a second user account has activated an option on a graphical element to request modification rights to the content item, the content item being previously created by a different user than a user associated with the first user account, the graphical element being separate from the content item;
in response to determining that the first user account has activated the option on the graphical element, granting, by the content management system, modification rights to the first user account for the content item, the modification rights enabling the first user account to modify the content item on the content management system and synchronize the content item with a local copy of the content item on one or more client devices associated with the first user account; and synchronizing, by the content management system, the content item with at least one client device from the one or more client devices associated with the first user account.

2. The method of claim 1, wherein granting modification rights is performed in response to determining that at least one permission criterion has been satisfied.

3. The method of claim 2, wherein the at least one permission criterion comprises at least one of:

the second user account and the first user account are members of a common group on a social media site that is separate from the content management system;

the first user account is a member of a list of contacts associated with the second user account; or the second user account has previously granted the first user account permission to upload content to the content item.

4. The method of claim 1, further comprising:

determining that at least one permission criterion specified by the second user account has not been satisfied; and at least partially in response to determining that the at least one permission criterion has not been satisfied, requesting authorization from the second user account to grant the first user account modification rights to the content item.

5. The method of claim 1, wherein synchronizing the content item with at least one client device authorized on the first user account comprises:

determining access rights assigned to the content item on the content management system for the first user account;

based on the determining of the access rights assigned to the content item, verifying that the first user account does not have read-only access to the content item and modification rights have been granted to the first user account;

determining that the at least one client device is authorized at the content management system for the first user account; and in response to determining that the at least one client device is authorized for the first user account and verifying that the first user account does not have read-only access to the content item and modification rights have been granted to the first user account:

enabling the local copy of the content item to be stored at the at least one client device; and sending the content item to the at least one client device for storage as the local copy.

6. The method of claim 1, wherein the content item comprises a shared folder within the content management system, wherein the modification rights include at least one of a first right to add files to the shared folder, a second right to delete files from the shared folder, or a third right to edit files that are stored within the shared folder.

7. The method of claim 1, wherein granting modification rights further comprises:

associating the content item with the first user account on the content management system, and converting the read-only access to the content item to modification rights to the content item.

8. A non-transitory computer-readable storage medium comprising:

instructions stored thereon which, when executed by one or more processors, cause a content management system to:

determine that a first user account having read-only access to a content item stored on the content management system and shared with the first user account by a second user account has activated an option on a graphical element to request modification rights to the content item, the content item being previously created by a different user than a user associated with the first user account, the graphical element being separate from the content item;

in response to determining that the first user account has activated the option on the graphical element, convert the read-only access of the first user account to the content item to modification rights for the first user account to the content item, the modification rights enabling the first user account to modify the content item on the content management system and synchronize the content item with a local copy of the content item on one or more client devices associated with the first user account; and synchronize the content item with at least one client device from the one or more client devices associated with the first user account.

9. The non-transitory computer-readable storage medium of claim 8, wherein granting modification rights is performed in response to determining that at least one permission criterion has been satisfied.

10. The non-transitory computer-readable storage medium of claim 9, wherein the at least one permission criterion comprises:

the second user account and the first user account are members of a common group on a social media site that is separate from the content management system.

11. The non-transitory computer-readable storage medium of claim 8, storing additional instructions which, when executed by the one or more processors, cause the content management system to:

determine that at least one permission criterion specified by the second user account has not been satisfied; and at least partially in response to determining that the at least one permission criterion has not been satisfied, request authorization from the second user account to grant the first user account modification rights to the content item.

12. The non-transitory computer-readable storage medium of claim 8, wherein the content item comprises a shared folder within the content management system.

13. The non-transitory computer-readable storage medium of claim 12, wherein the modification rights include at least one of a first right to add files to the shared folder, a second right to delete files from the shared folder, or a third right to edit files that are stored within the shared folder.

14. The non-transitory computer-readable storage medium of claim 8, wherein converting the read-only access to modification rights comprises:

associating the content item with the first user account on the content management system, and granting the first user account modification rights to the content item.

15. A content management system comprising:
one or more processors;
at least one computer-readable storage medium storing instructions which, when executed by the one or more processors, cause the content management system to:
determine that a first user account having read-only access to a content item stored on the content management system and shared with the first user account by a second user account has activated an option on a graphical element to request modification rights to the content item, the content item being previously created by a different user than a user associated with the first user account, the graphical element being separate from the content item;
in response to determining that the first user account has activated the option on the graphical element, grant modification rights to the first user account for the content item; and
synchronize the content item with at least one client device from the one or more client devices associated with the first user account.

16. The content management system of claim 15, wherein granting modification rights is performed in response to determining that at least one permission criterion has been satisfied.

17. The content management system of claim 16, wherein the at least one permission criterion comprises:
the first user account is a member of a list of contacts configured on the second user account.

18. The content management system of claim 15, the at least one computer-readable storage medium storing additional instructions which, when executed by the one or more processors, cause the content management system to:
determine that at least one permission criterion specified by the second user account has not been satisfied; and
at least partially in response to determining that the at least one permission criterion has not been satisfied, request authorization from the second user account to grant the first user account modification rights to the content item.

19. The content management system of claim 15, wherein the content item comprises a shared folder within the content management system, wherein the modification rights include at least one of a first right to add files to the shared folder, a second right to delete files from the shared folder, or a third right to edit files that are stored within the shared folder.

20. The content management system of claim 15, wherein granting modification rights further comprises:
associating the content item with the first user account on the content management system, and
converting the read-only access to the content item to modification rights to the content item.

* * * * *